Patented May 23, 1950

2,509,026

UNITED STATES PATENT OFFICE 2,509,026

METHOD OF MAKING SILICEOUS PRODUCTS

John F. White, Medford, Mass., assignor to Monsanto Chemical Company, St. Louis, Mo., a corporation of Delaware No Drawing. Application March 30, 1946, Serial No. 658,587

3 Claims. (Cl. 18—54)

This invention relates to methods of making solid products of silica having resinous or plastic properties.

The products produced by the invention are in general prepared from colloidal dispersions of silica in organic solvents, and particularly in anhydrous solvents of the type which are miscible with water. When these colloidal dispersions or anhydrous organosols are diluted with water, the silica contained therein is precipitated in a plastic or resinous state. The resulting precipitate may be removed from the sol or solution by filtration, washed to remove impurities, and then mechanically dried, as by pressing between sheets of absorptive material, centrifuging or the like. The final product, which is gummy or plastic in character but hardens on standing for 8 to 10 hours, may be used to cement surfaces together or cause them to adhere. When the original organosol is injected into water through a pipette tip or spinneret placed below the surface of a suitable quantity of water, fibers or filaments two to three inches long are formed.

The organosols or colloidal solutions of silica used in accordance with the invention may be prepared in a variety of ways, but are preferably prepared by the methods described in patent to Morris D. Marshall No. 2,386,247, granted October 9, 1945, particularly the methods described therein which relate to the use of water-miscible organic solvents. In general, these sols which are substantially anhydrous are prepared by first forming an aquasol containing colloidal silica and a dissolved inorganic salt, usually sodium sulfate, as for example by reacting an aqueous solution of sodium silicate with dilute sulfuric acid in suitable proportions, preferably in such amounts as to produce a sol having a pH between 2 and 4 to insure maximum stability during the preparation of the organosols. A water-miscible organic solvent, such as ethyl or propyl alcohol, is then added to the resulting aquasols in an amount sufficient to precipitate the inorganic salt and to permit substantially complete removal of the water by distillation. The precipitated inorganic salt is then removed by filtration, centrifuging or the like, and finally the water is removed by distillation.

The above process results in the production of organosols which are substantially free of water, i. e. contain not more than about 1% of water. Products containing only traces of water may however, easily be obtained by subjecting the above sols to a second or third distillation, which may or may not involve replacement of the original organic solvent with another organic solvent.

The organic solvent initially employed in the preparation of the organosols should be of such a nature as to cause substantially complete precipitation of inorganic salts and should either have a boiling point higher than that of water, i. e. sufficiently higher to permit substantially complete removal of the water by simple distillation, e. g. Cellosolve, methyl Cellosolve and diethyl Carbitol, or it should be capable of forming a constant boiling mixture with water either by itself or in combination with a third or a plurality of additional components, which mixture can then be fractionally or otherwise distilled off leaving as the residue a sol containing the desired inorganic liquid as the dispersing medium or continuous phase.

A most suitable solvent for forming a binary constant boiling mixture with water is normal propyl alcohol, which not only is highly miscible with water, but is relatively cheap and may be obtained in large quantities. Ethyl alcohol may also be used in accordance with this invention, but as ethyl alcohol does not form a satisfactory binary constant boiling mixture with water for the purposes of this invention, a third component such as benzene, dichloro ethylene, trichloro ethylene and the like is added, which forms a mixture capable of boiling off as a ternary constant boiling mixture. This mixture is fractionally distilled to produce a sol having substantially anhydrous ethyl alcohol as the continuous phase.

By way of example, a detailed description of the preparation of propyl alcohol sols suitable for the purposes of this invention is hereinafter given.

Three hundred fifty-eight pounds of sodium silicate containing 28.7% $SiO_2$, 8.9% $Na_2O$ and 62.4% $H_2O$ are diluted with one hundred sixty-two pounds of water. This mixture is then added to one hundred sixty-three and one-half pounds of 31% sulfuric acid and the mass is agitated to distribute the silicate throughout the acid. The mixing is carried out in a suitable acid resistant apparatus at a temperature of about 15° C., and results in a silica sol having a pH of about 2.5. One thousand three hundred and seventy-five pounds of normal propyl alcohol are then added to the sol gradually with stirring while maintaining the temperature at about 15° C. This causes precipitation of substantially all of the inorganic salt, which is then removed by filtering or centrifuging. To the clear sol one thousand five hundred and forty pounds of additional normal propyl alcohol are added, which reduces the $SiO_2$ content to about 3%. The sol is then distilled in a lead still equipped with a stirrer and a fractionating column. During the distillation the refluxing ratio is maintained in such a manner as to obtain 73% propanol in the first 50% of the distillate, about 92% propanol in the next 20% of the distillate, and about 99% propanol in the last 30%, which leaves as a residue a sol containing about 25% $SiO_2$.

Other examples of the preparation of specific organosols suitable for the purposes of this invention will be found in the above mentioned patent to Morris D. Marshall.

A further understanding of the present invention will be obtained from the following examples which describe the preparation of silica in a plastic or resinous state:

Example I

Two hundred grams of water were added to 100 grams of a propyl alcohol sol prepared as described in detail above, but containing 20% of $SiO_2$. This resulted in the formation of a coherent doughy precipitate, which was washed several times by working the mass in water. The precipitate was then removed by filtration and dried by pressing between sheets of filter paper. The resulting material is suitable for use as an adhesive, for example in binding together layers of paper to form corrugated paper.

Example II

Two hundred grams of water were added to 200 grams of propyl alcohol sol prepared as described in detail above, but containing 25% of $SiO_2$. This resulted in the formation of a gummy precipitate, which was collected on a filter, washed with water and allowed to dry on the filter. It was found to be suitable for use as an adhesive layer in laminated structures, and formed a firm bond upon permitting the laminated material to stand for 10 to 12 hours.

Example III

One hundred grams of an anhydrous ethyl alcohol sol prepared as described above and containing 20% of $SiO_2$ were added to 300 grams of water. This resulted in the formation of a precipitate which was filtered, but not washed. The filter cake was dry pressed between sheets of filter paper, after which it contained 40% solids and was in a plastic condition suitable for adhesive purposes.

Example IV

A propyl alcohol sol prepared as described in detail above and containing 5% of $SiO_2$ was forced into water through a pipette tip. The $SiO_2$ in the sol precipitated out in the form of a long coherent fibers or filaments, which are initially in a plastic state but harden on standing.

Although the above examples refer only to the use of ethyl alcohol and propyl alcohol sols, it will be understood that any of the substantially anhydrous organosols mentioned above or described in the Marshall patent may be used, provided the solvents employed are water-miscible. The products obtained in all instances are resinous or plastic in nature, and may be readily worked for several or more hours after their formation. Since they harden on standing for longer periods, they are suitable for adhesive purposes, and in some instances for forming into shaped objects.

The products of this invention are mixtures of major amounts of silica and water together with small amounts of organic solvent. In general, the products contain about 40% solids, which, since they are derived from silica sols, consist essentially of silica. The remainder of the material is primarily water.

What I claim is:

1. The method of preparing a plastic siliceous mass which comprises diluting an anhydrous water-miscible silica organosol with water in an amount by weight at least equal to the amount of said organosol sufficient to precipitate the silica contained therein, removing the precipitate from the liquid, and mechanically drying the precipitate until it contains a major amount of silica.

2. The method substantially as described in claim 1, but further characterized in that the precipitate is mechanically dried until it contains about 40% of silica.

3. The method of making silica filaments which comprises forcing an anhydrous silica organosol which is miscible with water through a small orifice into water, thereby precipitating the silica in said sol in the form of filaments, removing the filaments from the solution, mechanically drying the filaments until they contain a major amount of silica and allowing said filaments to stand for at least 8 hours until they become hardened.

JOHN F. WHITE.

REFERENCES CITED

The following references are of record in the file of this patent:

UNITED STATES PATENTS

| Number | Name | Date |
|---|---|---|
| 2,042,702 | Dreyfus | June 2, 1936 |
| 2,039,454 | Kistler | Sept. 21, 1937 |
| 2,285,449 | Marshall | June 9, 1942 |
| 2,338,463 | Skaupy et al. | Jan. 4, 1944 |
| 2,347,733 | Christensen | May 2, 1944 |

FOREIGN PATENTS

| Number | Country | Date |
|---|---|---|
| 665,099 | Germany | Sept. 21, 1938 |